(12) United States Patent
Subert et al.

(10) Patent No.: US 12,143,483 B2
(45) Date of Patent: Nov. 12, 2024

(54) SPLIT PROCESSING OF BIOMETRIC DATA

(71) Applicant: APPLE INC., Cupertino, CA (US)

(72) Inventors: Martin Subert, Sestajovice (CZ); Colin Christopher Terndrup, Redwood City, CA (US); Vamsi Krishna Kambhampati, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 17/654,964

(22) Filed: Mar. 15, 2022

(65) Prior Publication Data

US 2022/0303131 A1 Sep. 22, 2022

Related U.S. Application Data

(60) Provisional application No. 63/162,327, filed on Mar. 17, 2021.

(51) Int. Cl.
H04L 9/08 (2006.01)
G06F 13/12 (2006.01)
G06F 21/32 (2013.01)
H04L 9/32 (2006.01)

(52) U.S. Cl.
CPC .......... H04L 9/0866 (2013.01); G06F 13/122 (2013.01); G06F 21/32 (2013.01); H04L 9/3231 (2013.01)

(58) Field of Classification Search
CPC ... H04L 9/0866; H04L 9/3231; H04L 9/0861; H04L 9/08; H04L 9/32; H04L 63/12; H04L 63/0861; G06F 13/122; G06F 21/32; G06V 10/993; G06V 40/1306
See application file for complete search history.

(56) References Cited

U.S. PATENT DOCUMENTS

2002/0174348 A1 11/2002 Ting et al.
2012/0102332 A1* 4/2012 Mullin ............... H04W 12/065
713/186

(Continued)

OTHER PUBLICATIONS

Bouazzouni et al., "Trusted Mobile Computing: An Overview of Existing Solutions", Future Generation Computer Systems, vol. 80, Mar. 31, 2018, pp. 1-17.

(Continued)

Primary Examiner — Shaqueal D Wade-Wright
(74) Attorney, Agent, or Firm — Kilpatrick Townsend & Stockton LLP

(57) ABSTRACT

In an embodiment, processing of biometric data is split between a processor on a peripheral device and a processor of a host device that is coupled with the peripheral device. One embodiment provides a method comprising, on a peripheral device coupled with a host device, capturing biometric data using a biometric sensor of a peripheral device and pre-processing the captured biometric data using a processor of the peripheral device. The processor of the peripheral device is separate from a processor of the host device and resides within a chassis or housing of the peripheral device. The method additionally includes pre-validating the pre-processed biometric data to determine whether the pre-processed biometric data meets a minimum quality threshold and transmitting the pre-validated biometric data to the host device for validation.

19 Claims, 9 Drawing Sheets

(56) References Cited

U.S. PATENT DOCUMENTS

| | | | |
|---|---|---|---|
| 2015/0071502 A1* | 3/2015 | Breznicky | G06F 21/32 |
| | | | 382/115 |
| 2017/0126672 A1* | 5/2017 | Jang | H04L 63/0492 |
| 2017/0185762 A1* | 6/2017 | Chang | H04L 63/0861 |
| 2017/0249451 A1* | 8/2017 | Andreeva | G06V 40/18 |
| 2017/0373844 A1* | 12/2017 | Sykora | H04L 63/0428 |
| 2020/0228341 A1* | 7/2020 | Mohassel | H04L 9/008 |

OTHER PUBLICATIONS

International Search Report and Written Opinion issued in PCT Application No. PCT/US2022/020547, dated Jun. 30, 2022 in 11 pages.

* cited by examiner

SPLIT PROCESSING OF BIOMETRIC DATA

CROSS-REFERENCES TO RELATED APPLICATIONS

The present application claims priority from and is a nonprovisional application of U.S. Provisional Application No. 63/162,327, entitled "Split Processing Of Biometric Data" filed Mar. 17, 2021, the entire contents of which are herein incorporated by reference for all purposes.

FIELD

Embodiments described herein relate to a system in which processing of biometric data can be split between a peripheral and host device.

BACKGROUND

In addition to or as a substitute for passwords, biometric data can be used to authenticate a user at an electronic device. Biometric authentication can be performed using fingerprint recognition, facial recognition, or a variety of other body measurements and/or calculations that are related to or based on human characteristics. Systems that make use of biometric authentication generally employ techniques to protect against the use of fraudulent biometric data to enable unauthorized users to gain access to the system.

SUMMARY

In an embodiment, processing of biometric data is split between a processor on a peripheral device and a processor of a host device that is coupled with the peripheral device. One embodiment provides a method comprising, on a peripheral device coupled with a host device, capturing biometric data using a biometric sensor of a peripheral device and pre-processing the captured biometric data using a processor of the peripheral device. The processor of the peripheral device is separate from a processor of the host device and resides within a chassis or housing of the peripheral device. The method additionally can include pre-validating the pre-processed biometric data to determine whether the pre-processed biometric data meets one or more minimum quality criteria (e.g., a minimum quality threshold). In accordance with a determination that the processed biometric data meets the one or more minimum quality criteria, the method can include transmitting the processed biometric data to the host device for validation.

One embodiment provides a peripheral electronic device comprising an interconnect to enable communication with a host device, a memory device, a biometric sensor, and a processor device including or coupled with a secure circuit. The processor device and/or secure circuit are configured to perform operations including to capture biometric data sampled via the biometric sensor, pre-process the captured biometric data, pre-validate the pre-processed biometric data to determine whether the pre-processed biometric data meets a minimum quality threshold, and transmit the pre-validated biometric data via the interconnect to the host device to enable authentication of an operation associated with an account of the host device.

One embodiment provides a data processing system comprising an interconnect to enable communication with a host device, a memory device, a biometric sensor, and a processor device including or coupled with a secure circuit. The processor device and/or the secure circuit can execute instructions that are read from the memory device. The instructions cause the processor device and/or secure circuit to perform operations comprising capturing biometric data using a biometric sensor of a peripheral device, pre-processing the captured biometric data using a processor of the peripheral device, wherein the processor of the peripheral device is separate from a processor of the host device, pre-validating the pre-processed biometric data to determine whether the pre-processed biometric data meets a minimum quality threshold, and transmitting the pre-validated biometric data to the host device for validation.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
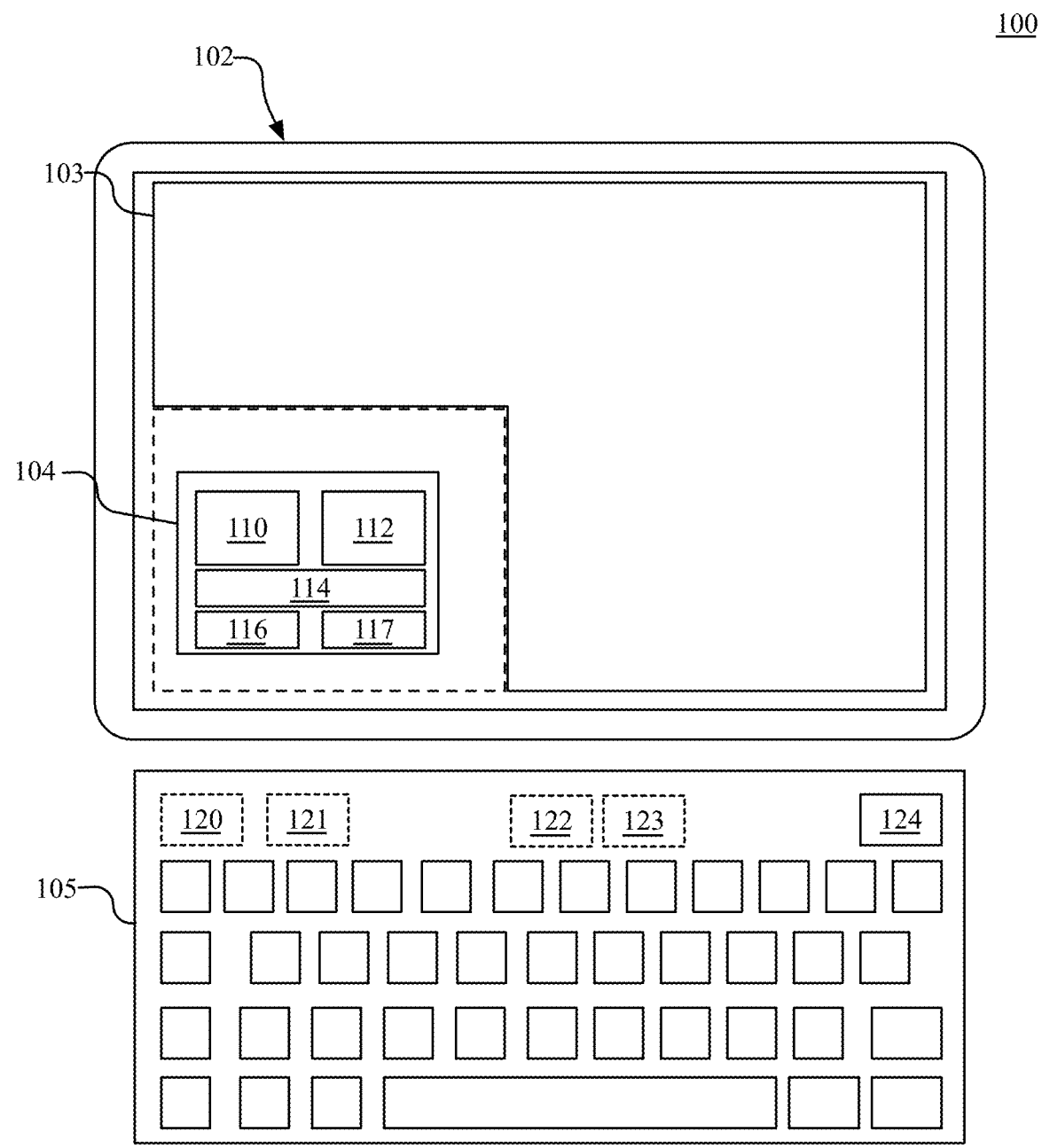
FIG. 1 illustrates a system that includes a host device and a peripheral device.

Embodiments described herein provide techniques to split the processing of biometric data between a processor on a peripheral device and a processor of a host device that is coupled with the peripheral device. The techniques described herein enable biometric sensors to be placed on peripheral devices that are not persistently hard-wired to a host device via an internal device interconnect. Interconnects to external peripheral devices may generally be of higher latency and/or lower bandwidth relative to internal interconnects that may be used by integrated biometric sensors. To compensate for the higher latency and/or lower bandwidth associated with an external peripheral interconnect, processing of biometric data may be split between a processor on the peripheral device and a processor of the host device. Pre-processing and pre-validation of biometric data can be performed on the sensor device and/or peripheral device before the data is transmitted over the external peripheral interconnect to the host. Biometric data can be encrypted before transmission and can be maintained in an encrypted format until processed by a secure circuit on the host device.

One embodiment provides a peripheral device that includes one or more processors in addition to one or more input mechanisms, such as an array of physical keys and/or one or more touch sensitive surfaces. The peripheral device can also include one or more sensor devices, such as a biometric sensor. Exemplary biometric sensors can include but are not limited to fingerprint readers. The peripheral device can couple with the host device via a wireless radio frequency protocol (e.g., Bluetooth®) or via a wired protocol such as a USB protocol. In one embodiment the techniques described herein may be transport agnostic and are capabilities are not limited by the connection mechanism between the peripheral device and the host device. Notwithstanding the transport mechanism, one or more encrypted communication channels can be established between the peripheral device and the host device to secure communication that occurs between the devices. Biometric data that is transmitted to the host device by the peripheral device may be further encrypted to provide an additional layer of security for the biometric data.

In one embodiment, the biometric sensor on the peripheral device can capture biometric data and pre-process the captured data before the data is relayed to the host processor. The pre-processing can include compiling data captured from multiple sensor elements of the biometric sensor and constructing an image that may be validated by biometric authentication logic. The constructed image can then be adjusting the captured data via calibration data that is specific to the biometric sensor. In one embodiment, voltage data from which the biometric sensor data was derived may be reconstructed using the calibration data. The pre-processing can additionally include pre-validating the captured data to determine if the data is of sufficient quality to enable the host device to perform biometric authentication. In one embodiment, the captured data can be reduced from a capture resolution and/or bit depth to an analysis resolution and/or bit depth before pre-validation.

After pre-validation, if the captured data is determined to meet a minimum quality threshold, the captured data is relayed to the host device. The host device can then authenticate the user based on the provided biometric data. Multiple captures can be gathered from the biometric sensor by the processor on the peripheral device and pre-validated until an image of sufficient quality is captured to avoid spending cycles on the host processor for images that are known to be too low of a quality to be successfully validated.

In one embodiment a processor on the peripheral device can include a secure circuit. The pre-processing of the biometric data can be performed at least in part using the secure circuit to enable captured biometric data to be processed in a manner that prevents the data from being accessed, read, or tampered with by other processes that may execute on the processor. A processor of the host device can also include a secure circuit that is used to validate the biometric data when the pre-validated biometric data is received from the peripheral device.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The device supports a variety of applications, such as one or more of the following: a note taking application, a drawing application, a presentation application, a word processing application, a website creation application, a disk authoring application, a spreadsheet application, a gaming application, a telephone application, a video-conferencing application, an e-mail application, an instant messaging application, a fitness application, a photo management application, a digital camera application, a digital video camera application, a web browsing application, a digital music player application, a digital video player application, and/or a home automation application.

FIG. 1 illustrates a system 100 that includes a host device 102 and a peripheral device 105. The host device 102 is an electronic device that includes but is not limited to a tablet computing device, television or television set top box, laptop computing device, or desktop computing device. The peripheral device 105 is peripheral device that includes one or more processors. The peripheral device 105 can be in the form of an input device such as but not limited to a keyboard device or other form of input device. For example, aspects of the peripheral device 105 described herein can be included in a mouse, touchpad, or other input peripheral device.

The host device 102 can include or couple with a display device 103. In one embodiment the host device 102 is a tablet computing device or laptop computing device and the display device 103 is integrated into the host device 102. In one embodiment the host device 102 is a desktop computing device having an integrated display device 103. In one embodiment the host device 102 is a desktop computing device having an interface through which an external display 103 may be coupled. The display device 103 can include any suitable type of display technology, including, but not limited to, liquid crystal display (LCD) technology, organic light-emitting display (OLED) technology, or organic electro luminescence (OEL) technology.

The host device 102 can include an integrated circuit 104, which in one embodiment is a system on a chip integrated circuit. The integrated circuit 104 can include an application processor 110 and a secure circuit 112, a memory device 114, a wireless interface 116 and a wired peripheral interface 117. In one embodiment the application processor 110 is a multi-core application processor including a variety of processing cores. In one embodiment the secure circuit 112 can provide a secure execution environment that is separate and distinct from the execution environment of the application processor 110. The secure circuit 112 may be a secure enclave processor (SEP) or another type of secure processor. The secure circuit 112 can include or couple with cryptographic accelerators, such as a cryptographic engine or public key accelerator. While the secure circuit 112 is illustrated as separate from the application processor 110, in one embodiment, the secure circuit 112 is a component of the application processor 110.

In one embodiment the memory device 114 is dedicated to the application processor 110 and provides an execution space for processes that are executed by the application processor 110. In one embodiment at least a portion of the memory device 114 is a secure memory that may be dedicated for exclusive use by the secure circuit 112. In one embodiment the memory device 114 is a high speed memory that is used as a cache memory for other volatile and/or non-volatile memory devices within or external to the integrated circuit 104. The wireless interface 116 and/or wired peripheral interface 117 can be used to establish a communication channel between components of the integrated circuit 104 and the peripheral device 105. For example, the wireless interface 116 may be a Bluetooth® interface that can be used to enable a wireless pairing between the host device 102 and the peripheral device 105. The wired peripheral interface 117 may be a USB controller that is used to enable a USB connection with the peripheral device 105. In one embodiment, data that is exchanged between the host device 102 and the peripheral device 105 can be encrypted using a secure, transport agnostic communication channel in addition to channel specific encryption that may be enabled for a wired or wireless connection.

The peripheral device 105, in addition to physical input components, can include a wireless interface module 120 and a wired interface module 121 that can be used to facilitate a wireless or wired coupling between the peripheral device 105 and the host device 102. The peripheral device 105 also includes a processor 122 and a secure circuit 123, as well as a biometric sensor 124. The wireless interface module 120, wired interface module 121, processor 122, and secure circuit 123 may be included on a circuit board or integrated circuit that is internal to the peripheral device 105, which may be a system on a chip (SoC) integrated circuit. Additionally, in one embodiment, the secure circuit 123 is included within the processor 122 or is integrated into the same die as the processor 122. Processor 122, in one embodiment, is a general-purpose low power processor that can execute one or more processes via memory internal to the processor 122 or via a memory device that is external to and coupled with the processor 122. The wired interface module 121 can couple with a wired connector on a housing of the peripheral device 105, such as a universal serial bus (USB) connector or another type of peripheral connector. At least a portion of at least one of the biometric sensor 124 may be on an external surface of the peripheral device 105 to facilitate the capture of biometric data.

The secure circuit 123 provides an execution environment for secure processes that is separate from the execution environment provided by the processor 122. The secure circuit 123 can include a secure processor, such as a secure enclave processor (SEP) and/or may be or include a encryption/decryption accelerator, such as a public key accelerator or cryptographic engine. Logic within or executed by the secure circuit 123 can be used to perform construction, pre-processing, and pre-validation operations on data that is captured from the biometric sensor 124. Pre-validated biometric data can be encrypted by the secure circuit 123 and transmitted by the processor 122 to the application processor 110 of the host device 102. The application processor 110 can then provide the biometric data to the secure circuit 112 for validation. The encrypted biometric data may be opaque to the processor 122 and the application processor 110 and can be encrypted using a shared secret and/or other cryptographic material that is established between the secure circuit 112 of the host device 102 and the secure circuit 123 of the peripheral device 105.

In one embodiment, the biometric sensor 124 includes a fingerprint sensing device, which may be a capacitive sensing device, although other types of sensing devices may also be used. The fingerprint sensing device can be used to detect the ridges and valleys of a fingerprint associated with a user and reconstruct an image of the fingerprint of the user. Data derived from the captured fingerprint image can then be compared with previously captured data that is associated with an account on the host device 102 to determine if the user associated with the captured fingerprint is an authorized user of the account on the host device 102.

In one embodiment, the secure circuit 112 can store a template database that includes biometric data for users that have registered for biometric authentication on the host device 102. During an enrollment process for biometric authentication, the biometric sensor 124 can be used to capture a baseline biometric image. Structured feature representations can be extracted from the biometric image and stored as template data in a template database within the secure circuit 112. During a subsequent biometric query associated with a biometric authentication attempt, a query image is captured by the biometric sensor 124 and the feature extraction process is applied to the query image. The features extracted from the query image can be compared to the features of the template data to determine a match.

Figure 2:
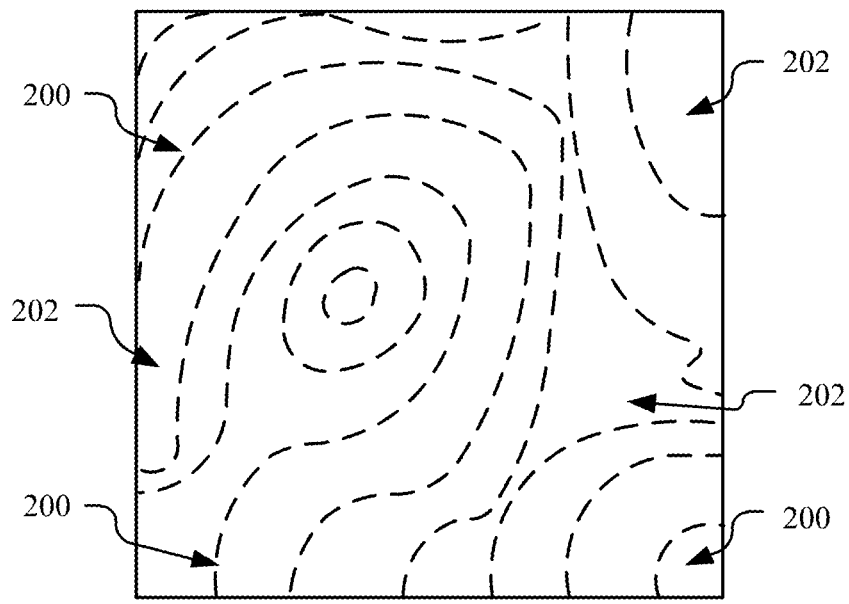
FIG. 2 is a graphic illustration of a portion of a fingerprint image.

FIG. 2 is a graphic illustration of a portion of a fingerprint image. The ridges 200 are represented with dashed lines. The valleys 202 are located in the areas between the ridges 200. Typically, the capacitance measured between a ridge 200 differs from the capacitance measured between a valley 202, such that the measured capacitance between a ridge and an electrode can be greater than the measured capacitance between a valley and an electrode. The differences in the measured capacitances can be used to distinguish between ridges and valleys. The differences in the measured capacitances can be translated to voltage or current values, then to digital data via the use of an analog to digital converter (ADC). While the captured data may be described herein using the term "image" or "fingerprint image," the captured data may be in the form of a data structure that defines the features in a fingerprint or another type of biometric data.

Figure 3:
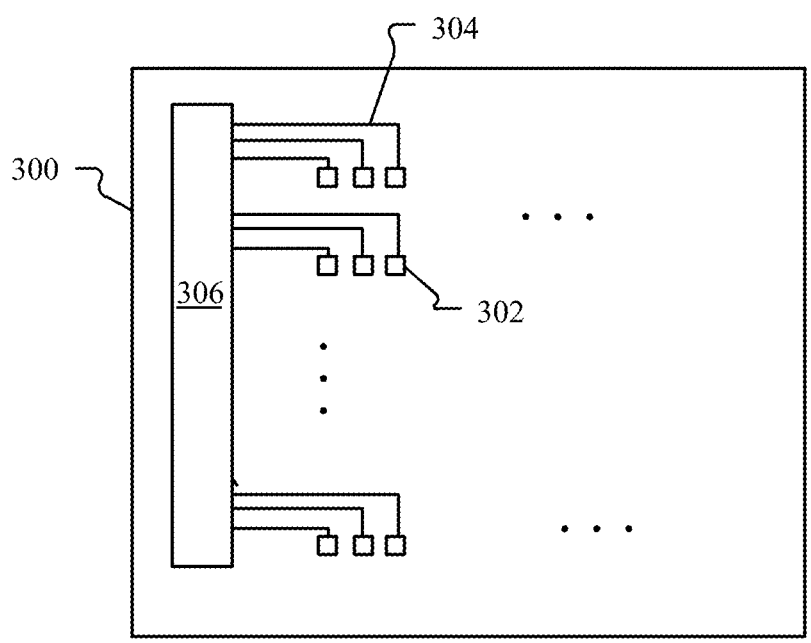
FIG. 3 illustrates a simplified capacitive fingerprint sensing device.

FIG. 3 illustrates a capacitive fingerprint sensing device 300. The capacitive fingerprint sensing device 300 can be used as the biometric sensor 124 of FIG. 1. The capacitive fingerprint sensing device 300 includes a conductive layer patterned into discrete electrodes or plates 302, with each plate connected to a sense line 304. Each discrete plate 302 is included in a sensing element. The sense lines 304 can be connected to sense circuits (not shown) through a sense interface 306. The conductive layer with the discrete plates 302 can be disposed over a common node layer (not shown). The combination of an individual plate 302 and the common node layer forms a capacitive sensor. In another embodiment, the plates 302 can be disposed under the common node layer. Typically, an insulating layer is disposed between the plates 302 and the common node layer. The capacitive sensors can operate in a self-capacitance mode in which the common node layer is connected to a reference voltage or signal, such as ground. The capacitance of a single plate 302 with respect to ground can be measured. A sense line 304 can be used to measure the capacitance between a plate 302 and the common node layer (e.g., ground).

Figure 4:
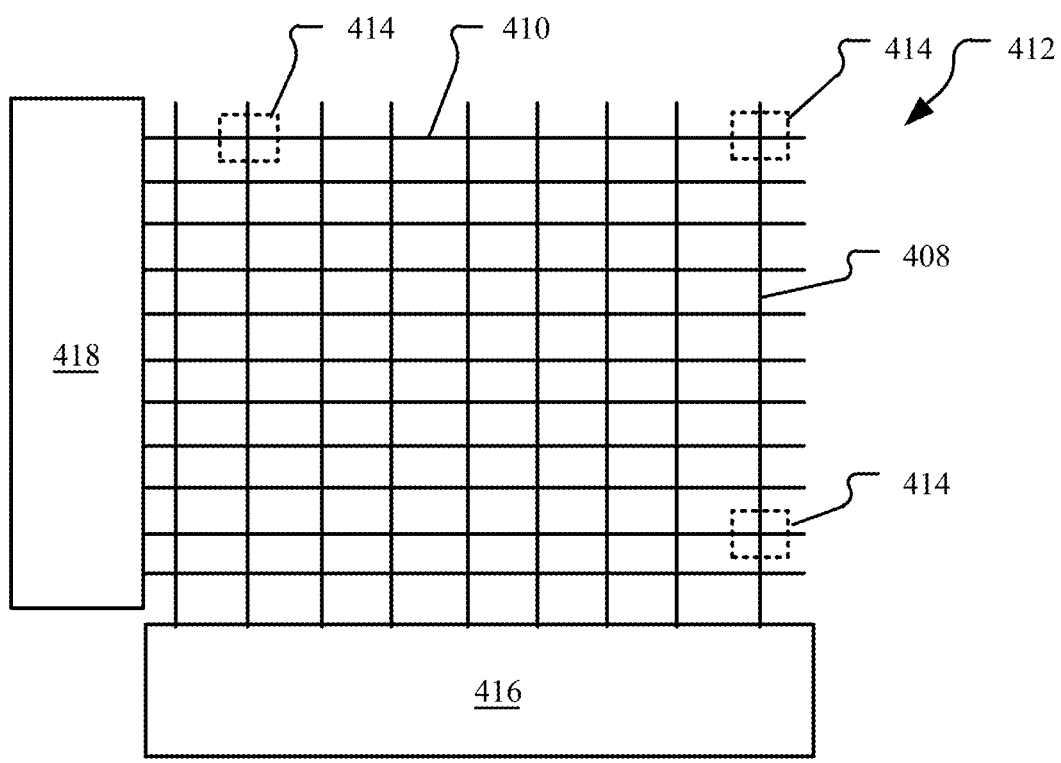
FIG. 4 illustrates an additional capacitive fingerprint sensing device.

FIG. 4 illustrates an additional capacitive fingerprint sensing device 400. Drive lines 408 and sense lines 410 are arranged to form an array 412. In the illustrated embodiment, the drive lines 408 are vertical lines and the sense lines 410 are horizontal lines. Other embodiments can arrange the drive lines as horizontal lines and the sense lines as vertical lines. A capacitive sensor 414 is formed at each intersection of a drive line and a sense line. The drive lines can be connected to drive circuits (not shown) through a drive interface 416. The drive lines can be driven sequentially or in some other pattern. The sense lines can be connected to sense circuits (not shown) through a sense interface 418. The sense lines can be sensed individually or in groups.

A fingerprint sensing device as illustrated in FIG. 3 or FIG. 4 can be included within the biometric sensor 124 of the peripheral device 105 of FIG. 1. The fingerprint sensing device can be used to capture an image of a fingerprint, or a portion of a fingerprint, when a finger or fingers touch an input surface, such as an exposed portion of the biometric sensor 124. The image of the fingerprint can be captured by measuring capacitive changes at one or more capacitive sensors. In one embodiment, the secure circuit 123 of the peripheral device 105 can read voltage values generated by the multiple discrete sensor elements of the fingerprint sensor and reconstruct an image of the fingerprint. In one embodiment a sensor processor or controller associated with the fingerprint sensor can transmit the voltage values, or multiple sub-images generated based on the voltage values, to the secure circuit 123 for reconstruction into a fingerprint image. While capacitive fingerprint sensors are described, the techniques described herein are not limited to any specific type of sensor. In one embodiment, capturing the biometric data using the biometric sensor can includes receiving a request (e.g., for user authentication) from the host device to enable the biometric sensor; reading sensor data from multiple sensor elements associated with the biometric sensor; and assembling a biometric image based on the sensor data read from the multiple sensor elements. Assembling the biometric image based on the sensor data can include adjusting data received from the multiple sensor elements according to calibration data for respective sensor elements of the multiple sensor elements Reconstruction of the fingerprint image can include applying calibration data to the data captured using the fingerprint sensor. Calibration data can be used, for example, to compensate for fixed pattern noise associated with the signal provided by the fingerprint sensor. One noise component is signal measurement variation noise, which is noise produced by variations in signal measurements between the sensors in a biometric sensing device. The second component is gain variation noise caused by variations in gain stages connected to the sensors in a biometric sensing device. In some embodiments, the noise compensation can be performed in two steps by first compensating for the signal measurement variation noise to produce a first compensated image, and then compensating for the gain variation noise using the first compensated image to produce a second compensated image. Initially, calibration data for the signal measurement variation noise and the gain variation noise can be obtained and stored in the biometric device, or within a non-volatile memory within the peripheral device 105. The signal measurement calibration data and the gain calibration data can then be used to compensate for the noise components when a new image or data is captured. Other types of calibration data may be used depending on the specifics of the biometric sensor.

While the use of capacitive fingerprint sensors are described herein, other types of biometric sensors, including other types of fingerprint sensors, can be included within a peripheral device. For example, a peripheral device may include an optical fingerprint sensor or an ultrasonic fingerprint sensor. Pre-processing and pre-validation operations can be performed for those sensors before biometric data is transmitted to the host device for matching. Peripheral devices having different types of sensors can generate a standard set of biometric data according to a pre-defined API or protocol to abstract the underlying technology of the sensor, enabling the host device to support biometric authentication using a variety of different peripheral devices that include a variety of different biometric sensing technologies.

Figure 5:
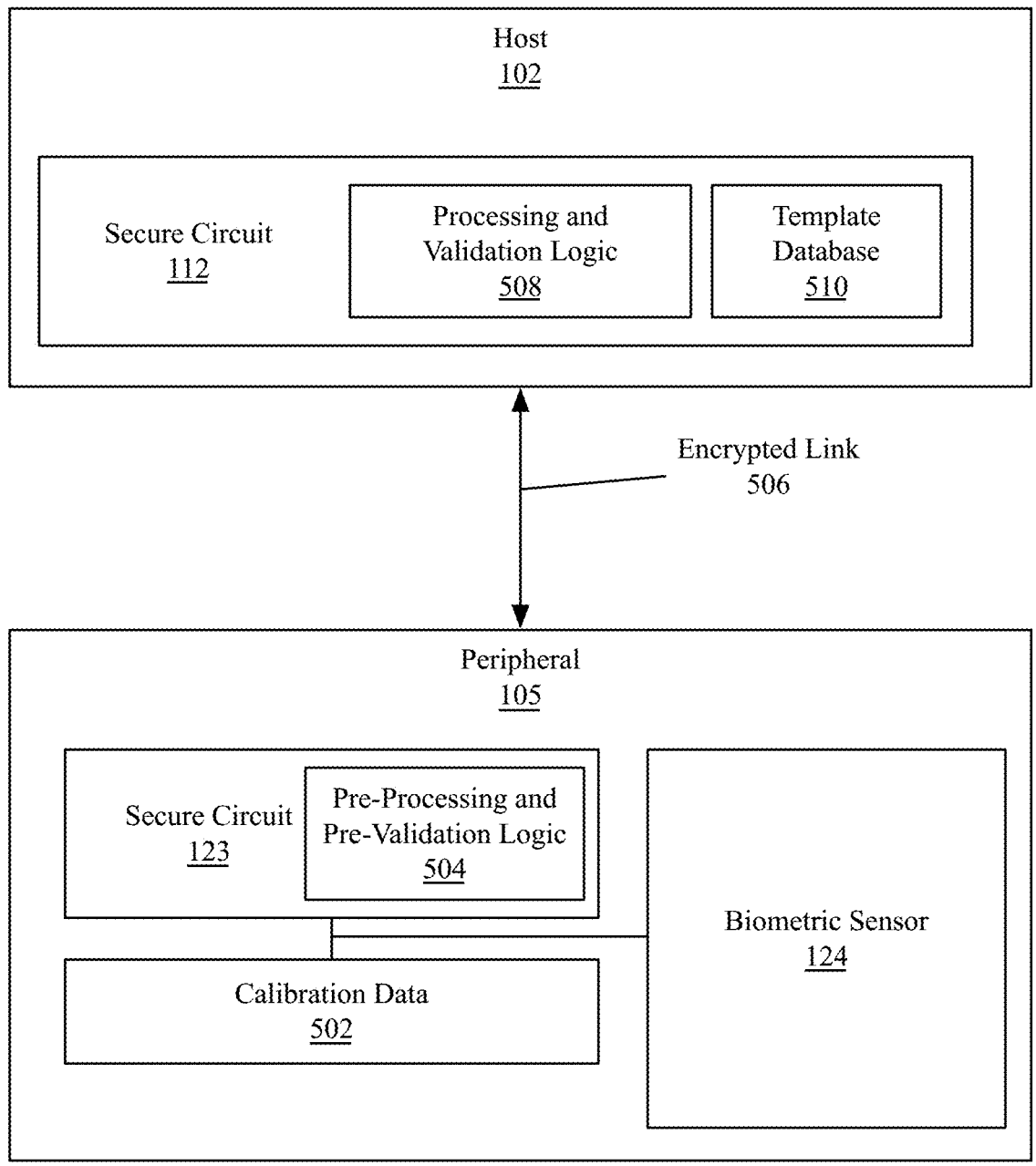
FIG. 5 illustrates a system in which processing of biometric data is split between the peripheral and the host.

FIG. 5 illustrates a system 500 in which processing of biometric data is split between the peripheral device 105 and the host device 102. In one embodiment, biometric data obtained from the biometric sensor can processed on the secure circuit 123 via pre-processing and pre-validation logic 504. In one embodiment, the biometric data provided to the secure circuit 123 may be include analog signal data in the form of an array of voltage values captured by the various sensor elements (e.g., capacitive sensor 414) of the biometric sensor 124. In one embodiment the data provided to the secure circuit 123 includes digital data that is generated based on analog to digital conversion logic within the biometric sensor 124. Calibration data 502 stored in persistent storage on the peripheral device 105 can be used to pre-process the biometric data that is received from the biometric sensor 124. Pre-processing can be performed to reconstruct biometric data from multiple data samples that are captured via the biometric sensor elements, filter noise from the reconstructed data using calibration data, and/or reconstruct sensor element voltages that correspond with a biometric image received from the sensor. Where the biometric sensor 124 outputs a biometric image, or samples that may be reconstructed into a biometric image, at a higher bit depth than the bit depth for which the pre-validation and validation logic is configured, the bit depth of the biometric image can be reduced before pre-validation. Bit-depth reduction can be performed before or after pre-processing operations. When performed before other pre-processing operations, bit-depth reduction may reduce the amount of time required to pre-process the biometric image. Bit depth reduction may also reduce the amount of time and/or bandwidth consumed to transmit the pre-validated biometric data to the host. When non image-based biometric data is used, the pre-processed biometric data may be down-sampled or reduced in size before pre-validation and transmission to the host device. The specific pre-processing and pre-validation techniques can vary based on implementation details of the biometric sensor 124. After pre-processing and pre-validation by the pre-processing and pre-validation logic 504, the peripheral device 105 can transmit the pre-processed and pre-validate biometric data via an encrypted link 506 that is established between the peripheral device 105 and the host device 102.

The secure circuit 112 on the host device 102 can receive the pre-processed and pre-validated biometric data via the encrypted link 506. The secure circuit 112 can then apply further processing and validation to the pre-validated biometric data via processing and validation logic 508. For example, the processing and validation logic 508 can perform feature extraction to extract global or local features from the biometric data. The processing and validation logic 508 can then perform matching operations on the biometric data, or features extracted from the biometric data. The reference images and/or features can be stored within a template database 510 stored within the secure circuit 112. The matching operation can be used to determine whether the biometric data is provided by an enrolled user. Based on the outcome of the matching operation, the host device 102 can grant or deny access to biometrically secured operations and/or features.

Figure 6:
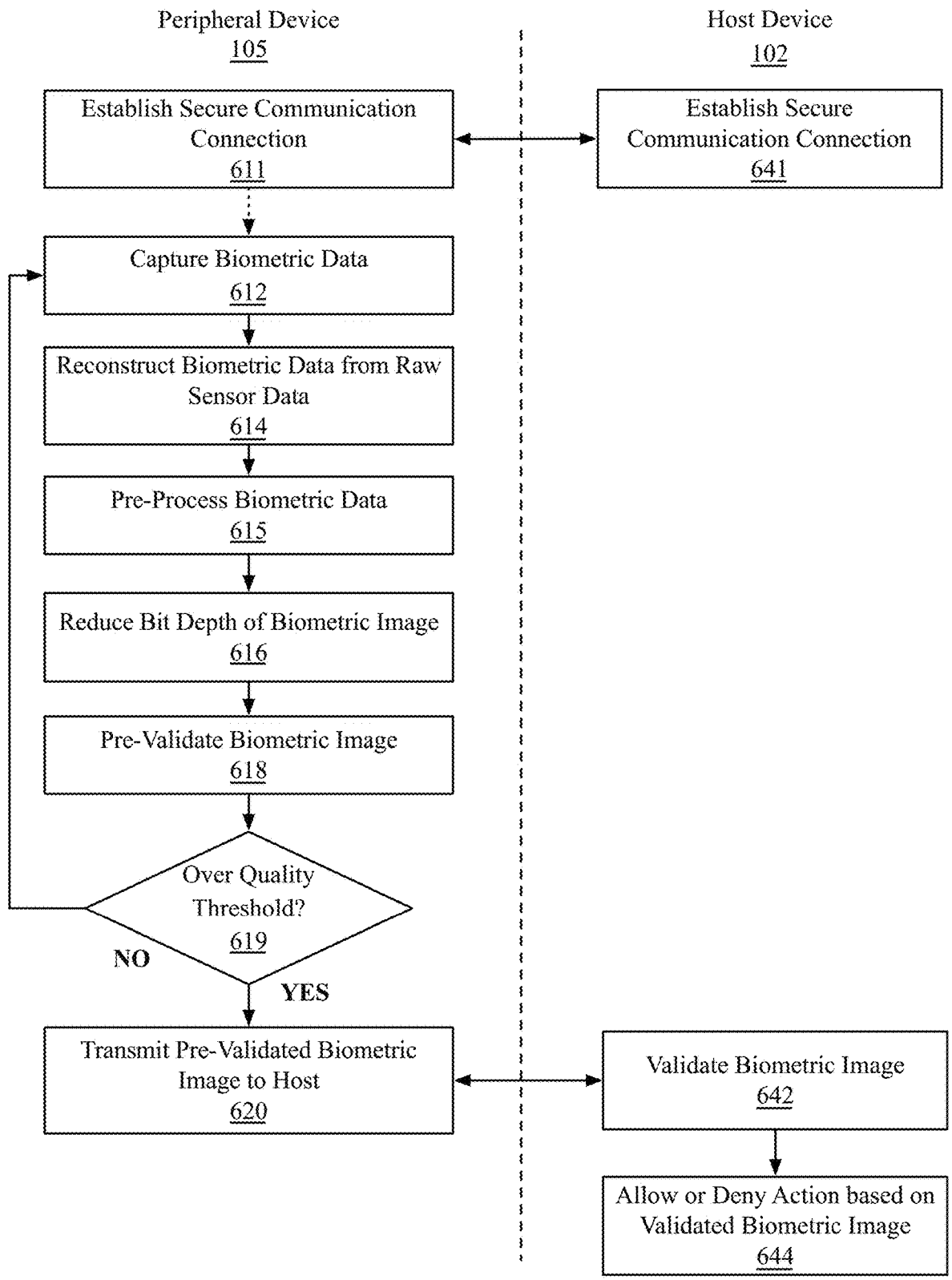
FIG. 6 illustrates a sequence of split-processing operations for biometric data that can be performed by a peripheral device and a host device.

FIG. 6 illustrates a sequence of split-processing operations for biometric data that can be performed by a peripheral device 105 and a host device 102. In one embodiment, the peripheral device 105 and the host device 102 can perform operations to establish a secure communication connection. The peripheral device 105 may perform a first operation 611 and the host device 102 may perform a second, counterpart operation 641. Either of the peripheral device 105 or the host device 102 can initiate the connection. In one embodiment the established connection is transport agnostic and can be performed over a wired or wireless connection. Encryption operations performed to secure the connection are performed in addition to any transport-specific encryption.

The peripheral device 105 can the perform an operation 612 to capture biometric data. Biometric data can be captured in response to a prompt presented by the host device 102 or while the host device 102 is presenting a login or lock screen. The peripheral device 105 can perform an operation 614 to process the raw sensor data that is captured from the biometric sensor into reconstructed biometric data. The reconstructed biometric data can include a biometric image, sensor voltage data, and metadata associated with the image or voltage data. In one embodiment, where a biometric image is reconstructed from the raw sensor data, voltage values for sensor elements of the biometric sensor may be reconstructed from the biometric image using calibration data for the biometric sensor elements.

The peripheral device 105 can then perform an operation 615 on the reconstructed biometric data to pre-process the biometric data to perform noise reduction and artifact suppression. The peripheral device 105 can then perform an operation 616 to reduce the bit depth of the biometric image to a lower bit depth. In one embodiment, the biometric sensor may be generate a biometric image at sixteen bits per pixel (or other number bits per pixel) and pre-processing operations can reduce the bit depth to eight bits per pixel before further processing is performed. Where the biometric data is non-image data, the biometric data may be down-sampled or otherwise reduced in size or resolution. In various embodiments, bit depth reduction and/or down-sampling can be performed before or after pre-processing.

Figure 7:
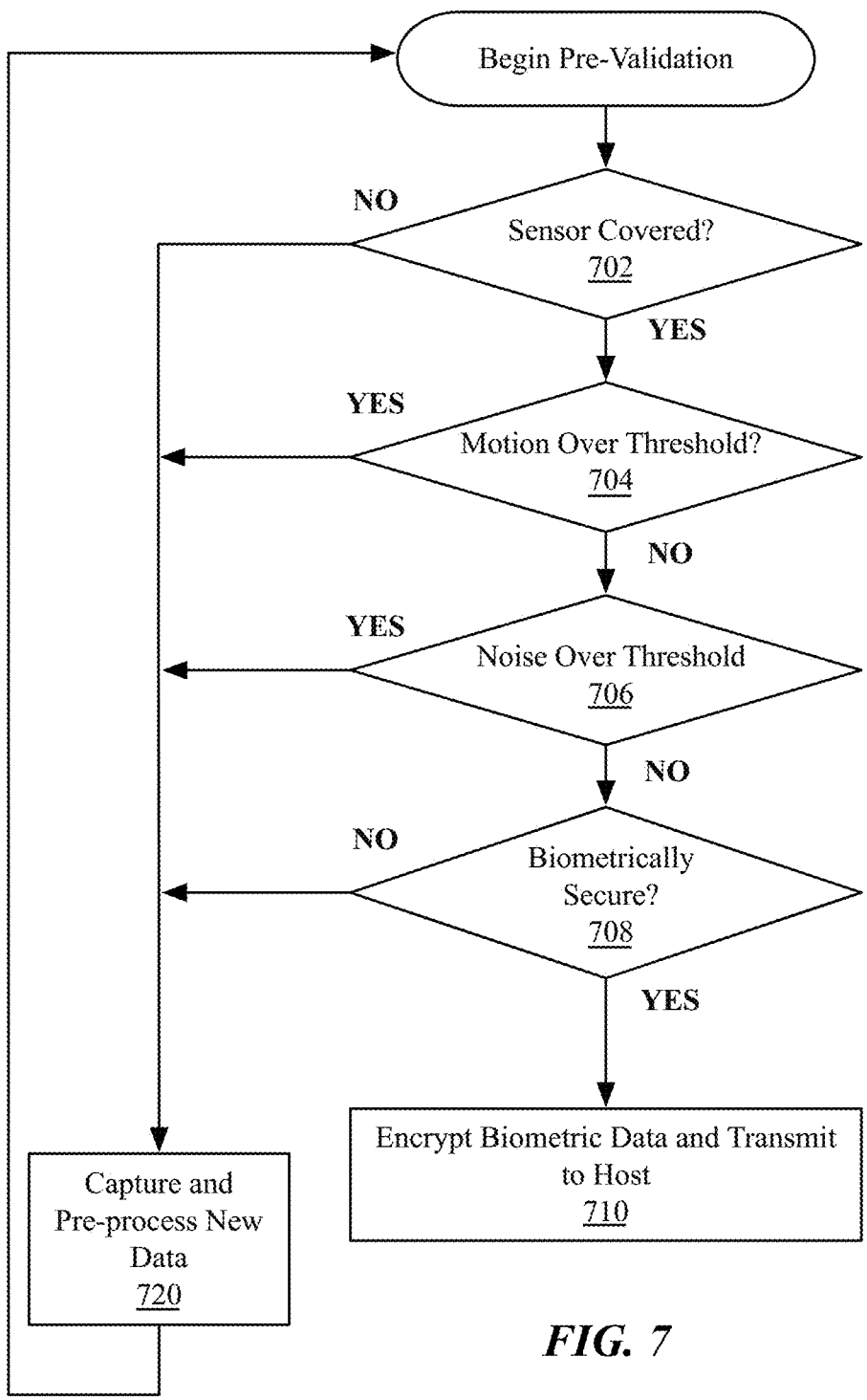
FIG. 7 illustrates a method of performing pre-validation of biometric data on a peripheral device.

The peripheral device 105 can then perform operations 618 to pre-validate the biometric image. The pre-validation can be performed to determine, for example, if the biometric image is over at least a threshold quality (619). Details regarding pre-validation operations, according to an embodiment, are shown in FIG. 7, which is described below. If the biometric image does not meet the quality threshold ("No", 619), the peripheral device 105 can perform the operation 612 to capture a new biometric image. In addition or alternatively, in accordance with a determination that the processed biometric data does not meet the one or more minimum quality criteria, methods can include foregoing transmission of the processed biometric data to the host device for validation. In various embodiments, the pre-processing and pre-validation operations performed by the peripheral device 105 can be performed by a secure circuit on the peripheral device 105. Examples of a quality threshold include a minimum completeness threshold, a minimum noise threshold, and a minimum motion threshold.

If the biometric image meets the quality threshold ("Yes", 619), the peripheral device 105 can perform an operation 620 to transmit the pre-validated biometric image to the host over the secure communication connection. The host device 102 can then perform operations 642 to validate the biometric image. Based on the validation, the host device 102 can then perform operations 644 to allow or deny an action based on the validated biometric image.

FIG. 7 illustrates a method 700 of performing pre-validation of biometric data on a peripheral device. Operations of the method 700 can be performed at least on part by a secure circuit 123 on a peripheral device 105, as described above, although some operations can be performed or assisted by the processor 122 of the peripheral device 105. Method 700 includes pre-validation operations according to one embodiment, and other embodiments can include different pre-validation operations or similar pre-validation operations that are performed in a different order. While the operations of method 700 are performed for a biometric sensor that includes a fingerprint reader, pre-validation operations may vary based on the type of biometric sensor in use. Pre-validation operations can be performed according to pre-processing and pre-validation logic 504 as in FIG.

5 to determine whether the pre-processed biometric data meets one or more minimum quality metrics. Pre-validation is performed to improve the probability that data that is sent to the host can be reliably validated as either a match or non-match for an enrolled user. For example, pre-validation can prevent the peripheral device from sending biometric data to the host that is of too low quality to enable reliable validation, such as incomplete data, noisy data, or data that is likely to lead to errors during the validation operations performed on the host device.

In one embodiment, method 700 includes for pre-validation logic on a peripheral can perform an operation 702 to determine of the surface of the biometric sensor is sufficiently covered. A processing loop including biometric data capture, reconstruction, pre-processing, and pre-validation can begin when the presence of at least a portion of a finger on the fingerprint reader is detected. When a user begins to place a finger on the sensor, a partial fingerprint may be initially detected. If a threshold amount of sensor coverage is not detected ("No", 702), further options 720 to capture and pre-process new biometric data can be performed. The degree of coverage that is considered sufficient can vary based on the specifics biometric sensor. The capture loop can continue until an amount of sensor coverage exceeds a threshold ("Yes", 702). In one embodiment, further pre-validation is blocked until a sensor coverage threshold is reached. In one embodiment, sensor coverage thresholds are considered in parallel with motion analysis performed across successive captures of biometric data.

Method 700 additionally includes for pre-validation logic to perform an operation 704 to determine if motion detected during capture of the biometric data exceeds a threshold. Detected motion within the biometric data may remain above a threshold ("Yes", 704) as the finger of the user transitions into the sensor. Detected motion may reach a minimum when the finger of the user settles on the sensor. Pre-validation can continue in response to a determination that motion within the biometric data is below a threshold ("No", 704), either alone or in combination with the sensor coverage threshold operation 702.

Method 700 additionally includes for pre-validation logic to perform an operation 706 to determine if noise associated with a captured biometric image exceeds a threshold. A certain degree of noise may be present in the biometric data due to the underlying electrical properties of the biometric sensor. Additionally, noise can occur when the biometric sensor is initially unable to accurately detect the location and motion of the finger during transition onto the sensor until the finger of the user is settled on the sensor. Noise within biometric data can be reduced via the application of calibration data during reconstruction. In one embodiment, operation 706 may be tuned to reject images having excessive sensor-based noise and/or noise within the biometric data that may be known to increase the false rejection rate of biometric data during the matching operation performed by the host. When the amount of noise within the biometric data exceeds a threshold ("Yes", 706), further options 720 to capture and pre-process new biometric data can be performed. Pre-validation can continue in response to a determination that noise within the biometric data is below a threshold ("No", 706), either alone or in combination with the sensor coverage threshold operation 702 and/or the motion threshold operation 704.

Method 700 additionally includes for pre-validation to perform an operation 708 to determine if the biometric image is biometrically secure. A minimum threshold of biometric security can be determined based on an analysis of the biometric data to determine if the data includes noise patterns that are known to increase the false acceptance rate of biometric data during the matching operation performed by the host. Such noise may naturally occur, or may suggest that a malicious user may be attempting to circumvent the biometric sensor. If the biometric data is not determined to be biometrically secure ("No", 708), further options 720 to capture and pre-process new biometric data can be performed. According to method 700, when operation 708 determines that the biometric data has a biometric security that exceeds a threshold, in combination with the determinations performed at operation 702, operation 704, and operation 706, processing proceeds to operation 710 to encrypt the biometric data and transmit the encrypted biometric data to the host device for validation. The biometric data can be encrypted by the secure circuit 123 of the peripheral device using cryptographic material stored on the secure circuit 123 or in secure memory that is encrypted by the secure circuit 123. The host device can perform further processing and validation operations on the received pre-validated biometric data, including feature extraction and biometric matching operations to validate an enrolled user associated with a user account.

Figure 8:
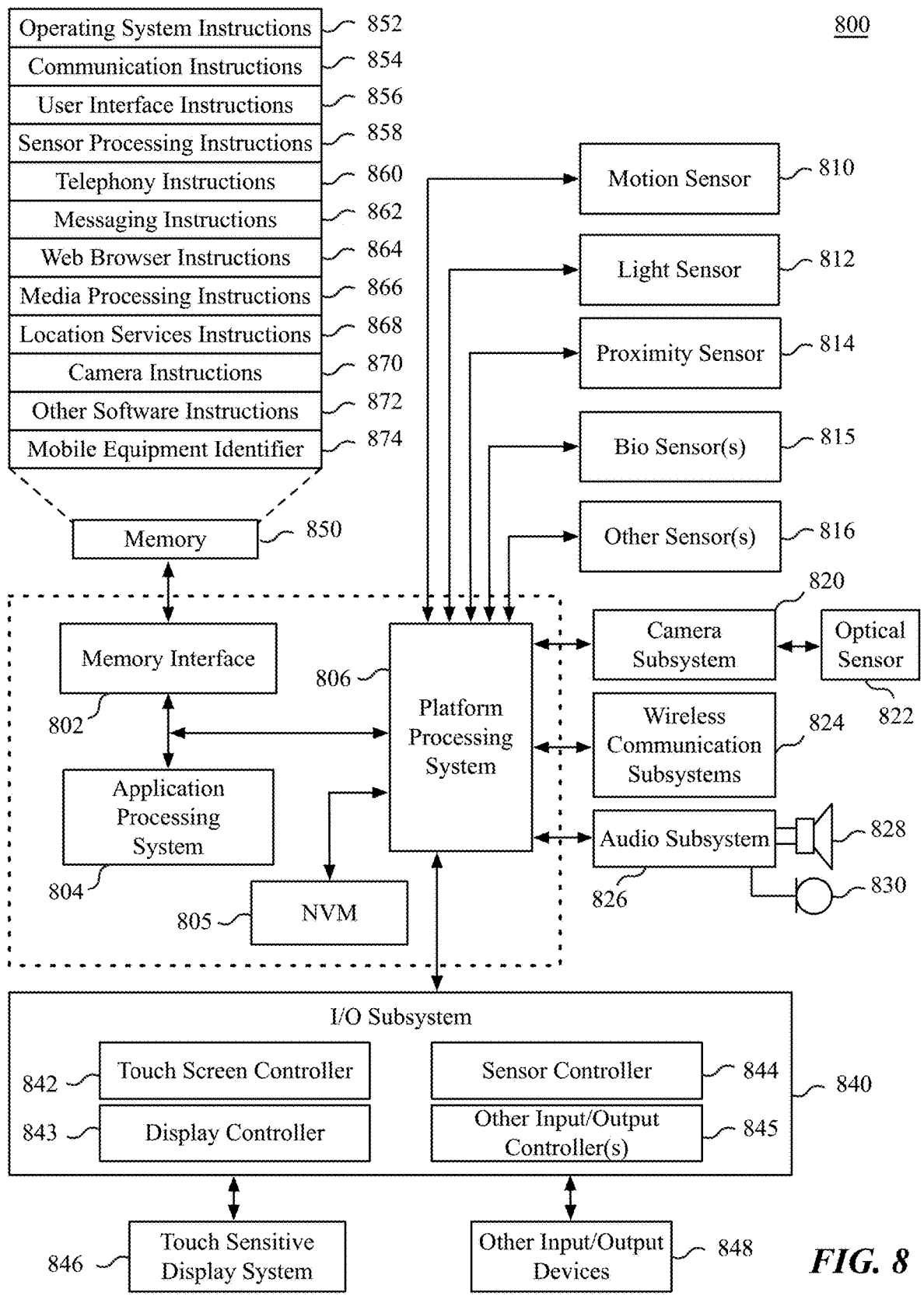
FIG. 8 is a block diagram of a computing device architecture, according to embodiments described herein.

FIG. 8 is a block diagram of a computing device architecture 800, according to an embodiment. The computing device architecture 800 includes a memory interface 802, a processing system 804, and a platform processing system 806. The platform processing system 806 can implement secure peripheral access and system authentication according to embodiments described herein. The various components can be coupled by one or more communication buses, fabrics, or signal lines. The various components can be separate logical components or devices or can be integrated in one or more integrated circuits, such as in a system on a chip integrated circuit. The processing system 804 may include multiple processors and/or co-processors. The various processors within the processing system 804 can be similar in architecture or the processing system 804 can be a heterogeneous processing system. In one embodiment, the processing system 804 is a heterogeneous processing system including one or more data processors, image processors and/or graphics processing units.

The memory interface 802 can be coupled to memory 850, which can include high-speed random-access memory such as static random-access memory (SRAM) or dynamic random-access memory (DRAM). The memory can store runtime information, data, and/or instructions are persistently stored in non-volatile memory 805, such as but not limited to flash memory (e.g., NAND flash, NOR flash, etc.). Additionally, at least a portion of the memory 850 is non-volatile memory. The platform processing system 806 can facilitate the communication between the processing system 804 and the non-volatile memory.

Sensors, devices, and subsystems can be coupled to the platform processing system 806 to facilitate multiple functionalities. For example, a motion sensor 810, a light sensor 812, and a proximity sensor 814 can be coupled to the platform processing system 806 to facilitate the mobile device functionality. Other sensors 816 can also be connected to the platform processing system 806, such as a positioning system (e.g., GPS receiver), a temperature sensor, a biometric sensor, or other sensing device, to facilitate related functionalities. A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

In one embodiment, the platform processing system 806 can enable a connection to communication peripherals including one or more wireless communication subsystems 824, which can include radio frequency receivers and transmitters and/or optical (e.g., infrared) receivers and transmitters. The specific design and implementation of the wireless communication subsystems 824 can depend on the communication network(s) over which a mobile device is intended to operate. For example, a mobile device including the illustrated computing device architecture 800 can include wireless communication subsystems 824 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The wireless communication subsystems 824 can provide a communications mechanism over which a client browser application can retrieve resources from a remote web server. The platform processing system 806 can also enable an interconnect to an audio subsystem 826, which can be coupled to a speaker 828 and a microphone 830 to facilitate voice-enabled functions, such as voice recognition, voice replication, digital recording, and telephony functions.

The platform processing system 806 can enable a connection to an I/O subsystem 840 that includes a touch screen controller 842 and/or other input controller(s) 845. The touch screen controller 842 can be coupled to a touch sensitive display system 846 (e.g., touch screen). The touch sensitive display system 846 and touch screen controller 842 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 846. Display output for the touch sensitive display system 846 can be generated by a display controller 843. In one embodiment, the display controller 843 can provide frame data to the touch sensitive display system 846 at a variable frame rate.

In one embodiment, a sensor controller 844 is included to monitor, control, and/or processes data received from one or more of the motion sensor 810, light sensor 812, proximity sensor 814, or other sensors 816. The sensor controller 844 can include logic to interpret sensor data to determine the occurrence of one of more motion events or activities by analysis of the sensor data from the sensors.

In one embodiment, the platform processing system 806 can also enable a connection to one or more biometric sensor(s) 815. The one or more biometric sensor(s) can be a fingerprint reader or other biometric sensor described herein that is configured to detect biometric data for a user of computing device. Biometric data may be data that at least quasi-uniquely identifies the user among other humans based on the user's physical or behavioral characteristics. For example, in some embodiments the biometric sensor(s) 815 can include a finger print sensor that captures fingerprint data from the user. In another embodiment, biometric sensor(s) 815 include a camera that captures facial information from a user's face. In some embodiments, the biometric sensor(s) 815 can maintain previously captured biometric data of an authorized user and compare the captured biometric data against newly received biometric data to authenticate a user. As described herein, in one embodiment one or more biometric sensor(s) 815 can also be included in a peripheral device.

In one embodiment, the I/O subsystem 840 includes other input controller(s) 845 that can be coupled to other input/control devices 848, such as one or more buttons, rocker switches, thumb-wheel, infrared port, USB port, and/or a pointer device such as a stylus, or control devices such as an up/down button for volume control of the speaker 828 and/or the microphone 830.

In one embodiment, the memory 850 coupled to the memory interface 802 can store instructions for an operating system 852, including portable operating system interface (POSIX) compliant and non-compliant operating system or an embedded operating system. The operating system 852 may include instructions for handling basic system services and for performing hardware dependent tasks. In some implementations, the operating system 852 can be a kernel or micro-kernel based operating system.

The memory 850 can also store communication instructions 854 to facilitate communicating with one or more additional devices, one or more computers and/or one or more servers, for example, to retrieve web resources from remote web servers. The memory 850 can also include user interface instructions 856, including graphical user interface instructions to facilitate graphic user interface processing.

Additionally, the memory 850 can store sensor processing instructions 858 to facilitate sensor-related processing and functions; telephony instructions 860 to facilitate telephone-related processes and functions; messaging instructions 862 to facilitate electronic-messaging related processes and functions; web browser instructions 864 to facilitate web browsing-related processes and functions; media processing instructions 866 to facilitate media processing-related processes and functions; location services instructions including GPS and/or navigation instructions 868 and Wi-Fi based location instructions to facilitate location based functionality; camera instructions 870 to facilitate camera-related processes and functions; and/or other software instructions 872 to facilitate other processes and functions, e.g., security processes and functions, and processes and functions related to the systems. The memory 850 may also store other software instructions such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. A mobile equipment identifier, such as an International Mobile Equipment Identity (IMEI) 874 or a similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions may be implemented in hardware and/or in software, including in one or more signal processing and/or application specific integrated circuits.

Figure 9:
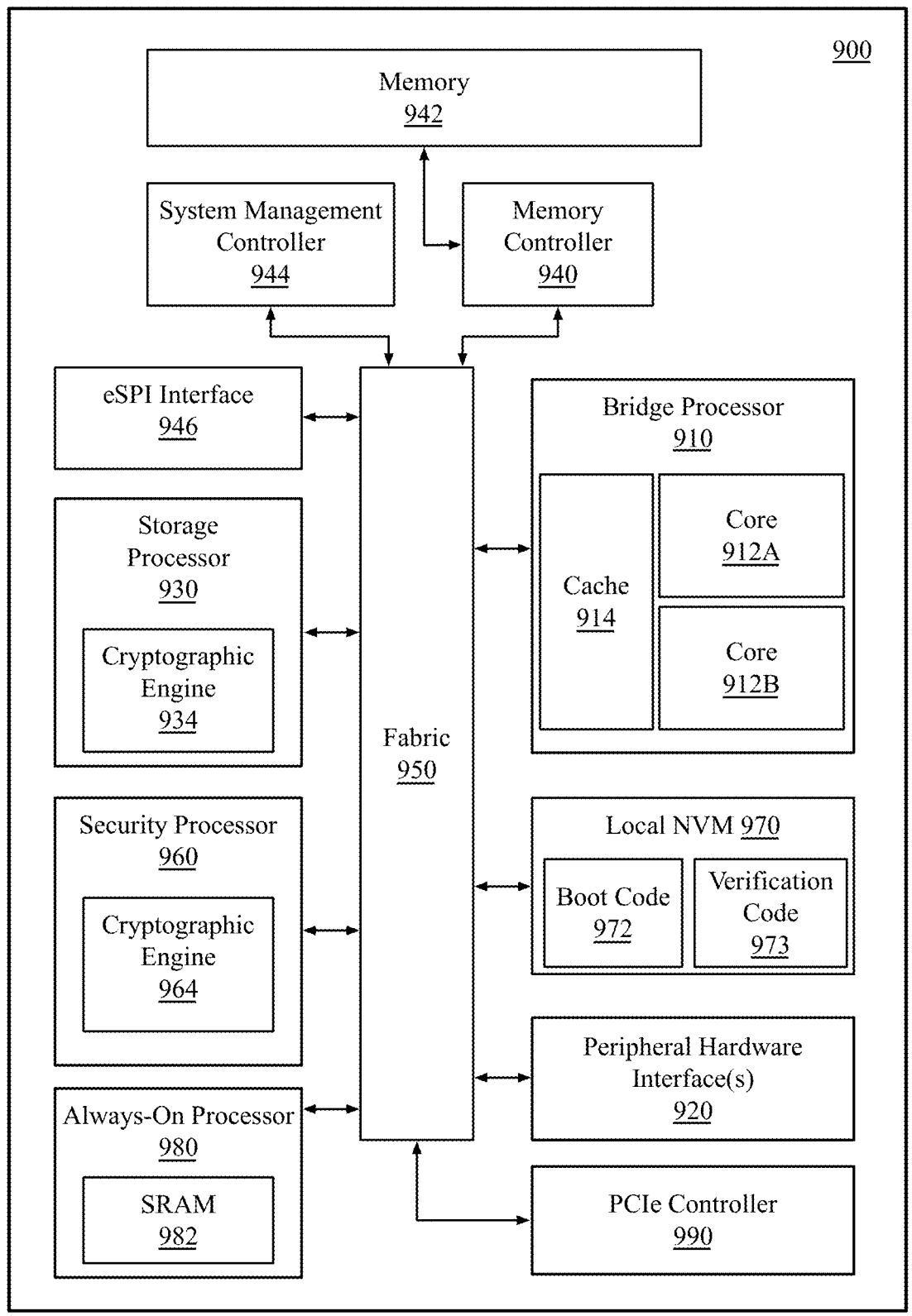
FIG. 9 is a block diagram of a platform processing system, according embodiments described herein.

FIG. 9 is a block diagram of a platform processing system 900, according to an embodiment. In one embodiment, the platform processing system 900 is a system on a chip integrated circuit that can be a variant of the platform processing system 806 of FIG. 8. The platform processing system, in one embodiment, includes a bridge processor 910 that facilitates an interface to the various system peripherals via one or more peripheral hardware interface(s) 920. In one embodiment, the platform processing system 900 includes a crossbar fabric that enables communication within the system, although a system bus may also be used in other embodiments. The platform processing system 900 can also include a system management controller 944 and always-on processor 980. The always-on processor can include SRAM 982 that is not required to be periodically refreshed, allowing a refresh circuit to be excluded. The platform processing system 900 can also include an eSPI interface 946, which can be an eSPI slave in communication with an eSPI master. The eSPI interface 946 can be used to enable the system management controller 944 to communicate with the compute SOC and other components external to the platform processing system 900. Additionally, the platform processing system 900 can also include a PCIe controller 990 to enable components of the platform processing system 900 to communicate with components of the computing device that are coupled to a PCIe bus within the system.

In one embodiment, the bridge processor 910 includes multiple cores 912A-912B and at least one cache 914. The bridge processor 910 can facilitate secure access to various peripherals described herein, including enabling secure access to camera, keyboard, or microphone peripherals to prevent an attacker from gaining malicious access to those peripherals. The bridge processor 910 can then securely boot a separate and complete operating system that is distinct from the user facing operating system that executes application code for the computing device. The bridge processor 910 can facilitate the execution of peripheral control firmware that can be loaded from local non-volatile memory 970 connected with the processor via the fabric 950. The peripheral firmware can be securely loaded into the memory 942 via a fabric-attached memory controller 940, enabling the bridge processor 910 to perform peripheral node functionality for the peripherals attached via the peripheral hardware interface(s) 920. In one embodiment, the peripheral firmware can also be included within or associated with secure boot code 972. The secure boot code 972 can be accompanied by verification code 973 that can be used verify that the boot code 972 has not been modified.

The platform processing system 900 also includes a security processor 960, which is a secure circuit configured to maintain user keys for encrypting and decrypting data keys associated with a user. As used herein, the term "secure circuit" refers to a circuit that protects an isolated, internal resource from being directly accessed by any external circuits. The security processor 960 can be used to secure communication with the peripherals connected via the peripheral hardware interface(s) 920. The security processor 960 can include a cryptographic engine 964 that includes circuitry to perform cryptographic operations for the security processor 960. The cryptographic operations can include the encryption and decryption of data keys that are used to perform storage volume encryption or other data encryption operations within a system.

The platform processing system 900 can also include a storage processor 930 that controls access to data storage within a system. The storage processor 930 can also include a cryptographic engine 934 to enable compressed data storage within the non-volatile memory. The cryptographic engine 934 can work in concert with the cryptographic engine 964 within the security processor 960 to enable high-speed and secure encryption and decryption of data stored in non-volatile memory. The cryptographic engine 934 in the storage processor 930 and the cryptographic engine 964 in the security processor may each implement any suitable encryption algorithm such as the Data Encryption Standard (DES), Advanced Encryption Standard (AES), Rivest Shamir Adleman (RSA), or Elliptic Curve Cryptography (ECC) based encryption algorithms.

Figure 10:
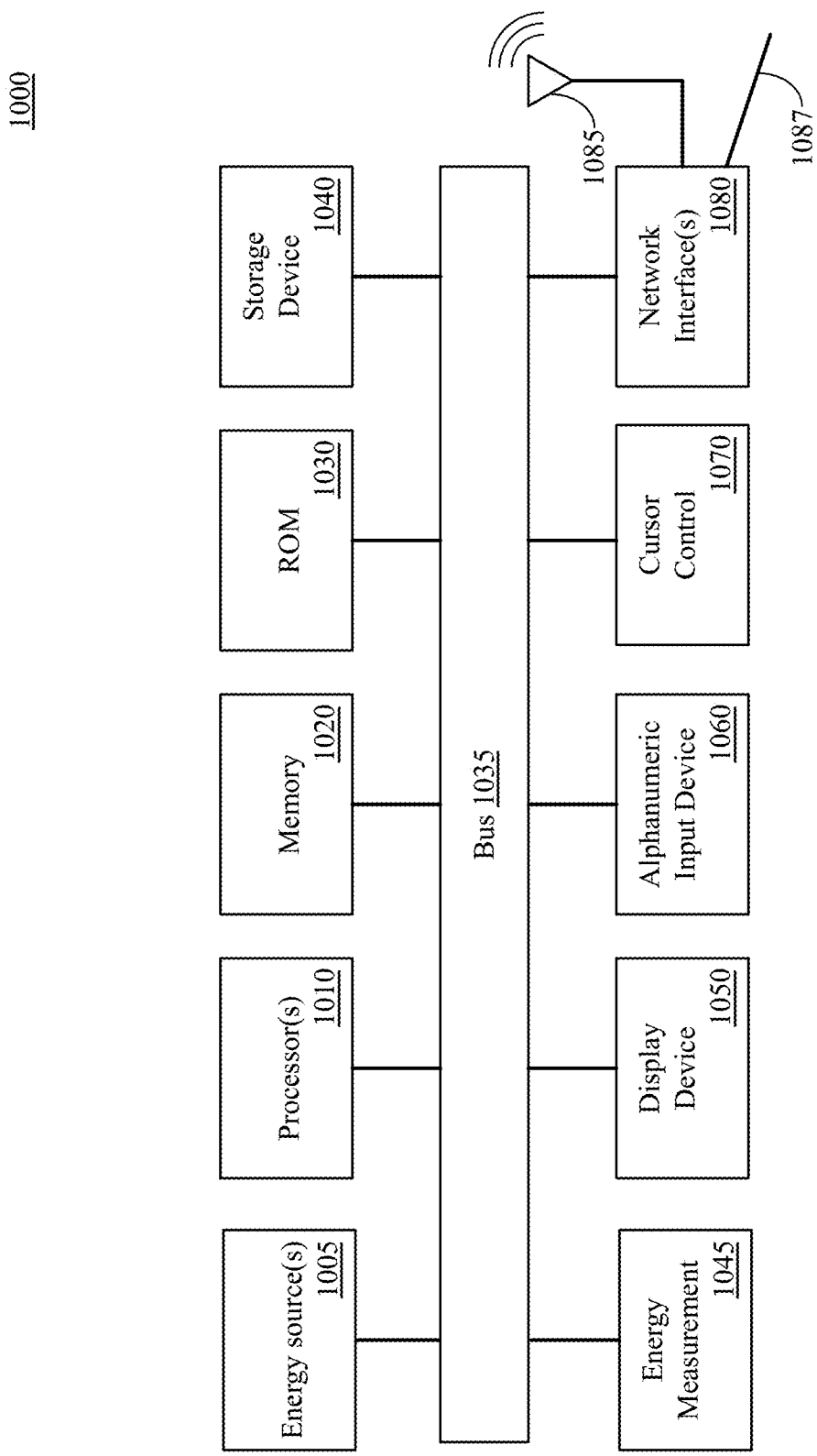
FIG. 10 is a block diagram of a computing system, according to an embodiment.

FIG. 10 is a block diagram of a computing system 1000, according to an embodiment. The illustrated computing system 1000 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1000 can be used to provide the computing device and/or a server device to which the computing device may connect.

The computing system 1000 includes bus 1035 or other communication device to communicate information, and processor(s) 1010 coupled to bus 1035 that may process information. While the computing system 1000 is illustrated with a single processor, the computing system 1000 may include multiple processors and/or co-processors. The computing system 1000 further may include memory 1020, such as random-access memory (RAM) or other dynamic storage device coupled to the bus 1035. The memory 1020 may store information and instructions that may be executed by processor(s) 1010. The memory 1020 may also be used to store temporary variables or other intermediate information during execution of instructions by the processor(s) 1010.

The computing system 1000 may also include read only memory (ROM) 1030 and/or another data storage device 1040 coupled to the bus 1035 that may store information and instructions for the processor(s) 1010. The data storage device 1040 can be or include a variety of storage devices, such as a flash memory device, a magnetic disk, or an optical disc and may be coupled to computing system 1000 via the bus 1035 or via a remote peripheral interface.

The computing system 1000 may also be coupled, via the bus 1035, to a display device 1050 to display information to a user. The computing system 1000 can also include an alphanumeric input device 1060, including alphanumeric and other keys, which may be coupled to bus 1035 to communicate information and command selections to processor(s) 1010. Another type of user input device includes a cursor control 1070 device, such as a touchpad, a mouse, a trackball, or cursor direction keys to communicate direction information and command selections to processor(s) 1010 and to control cursor movement on the display device 1050. The computing system 1000 may also receive user input from a remote device that is communicatively coupled via one or more network interface(s) 1080. The various input devices of the computing system 1000 may be in the form of the peripheral device 105 described herein.

The computing system 1000 further may include one or more network interface(s) 1080 to provide access to a network, such as a local area network. The network interface(s) 1080 may include, for example, a wireless network interface having antenna 1085, which may represent one or more antenna(e). The computing system 1000 can include multiple wireless network interfaces such as a combination of Wi-Fi, Bluetooth®, near field communication (NFC), and/or cellular telephony interfaces. The network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, the network interface(s) 1080 may provide access to a local area network, for example, by conforming to IEEE 802.10 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1000 can further include one or more energy sources 1005 and one or more energy measurement systems 1045. Energy sources 1005 can include an AC/DC adapter coupled to an external power source, one or more batteries, one or more charge storage devices, a USB charger, or other energy source. Energy measurement systems include at least one voltage or amperage measuring device that can measure energy consumed by the computing system 1000 during a predetermined period of time. Additionally, one or more energy measurement systems can be included that measure, e.g., energy consumed by a display device, cooling subsystem, Wi-Fi subsystem, or other frequently used or high-energy consumption subsystem.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method comprising:
on a peripheral device that is an input device having a processor and a biometric sensor:
capturing biometric data using the biometric sensor of the peripheral device;
processing the captured biometric data using the processor of the peripheral device, wherein the processor of the peripheral device is separate from a processor of a host device to which the peripheral device is connected;
determining whether the processed biometric data meets one or more minimum quality criteria; and
in accordance with a determination that the processed biometric data meets the one or more minimum quality criteria, transmitting the processed biometric data to the host device for validation, wherein the host device is a display device that is communicably coupled to the peripheral device, wherein the peripheral device is external to the host device, wherein the host device receives the processed biometric data and validates the processed biometric data to determine whether to allow or deny an action.

2. The method as in claim 1, further comprising, in accordance with a determination that the processed biometric data does not meet the one or more minimum quality criteria, foregoing transmission of the processed biometric data to the host device for validation.

3. The method as in claim 1, further comprising encrypting processed biometric data before transmitting the processed biometric data to the host device.

4. The method as in claim 1, wherein capturing the biometric data using the biometric sensor includes:
receiving a request from the host device to enable the biometric sensor;
reading sensor data from multiple sensor elements associated with the biometric sensor; and
assembling a biometric image based on the sensor data read from the multiple sensor elements.

5. The method as in claim 4, wherein assembling the biometric image based on the sensor data includes adjusting data received from the multiple sensor elements according to calibration data for respective sensor elements of the multiple sensor elements.

6. The method as in claim 5, further comprising reading the calibration data for the respective sensor elements from persistent storage on the peripheral device.

7. The method as in claim 6, wherein processing the captured biometric data includes reducing noise within the biometric image using the calibration data.

8. The method as in claim 7, further comprising reducing a number of bits per pixel of the biometric image from a first number of bits per pixel to a second number of bits per pixel.

9. The method as in claim 8, wherein the biometric sensor is a fingerprint sensor, the biometric data includes fingerprint data, and the biometric image is an image of a fingerprint.

10. The method as in claim 1, wherein determining whether the processed biometric data meets one or more minimum quality criteria includes determining whether the biometric data meets a minimum completeness threshold.

11. The method as in claim 1, wherein determining whether the processed biometric data meets one or more minimum quality criteria includes determining whether the biometric data meets a minimum noise threshold.

12. The method as in claim 1, wherein determining whether the processed biometric data meets one or more minimum quality criteria includes determining whether the biometric data meets a minimum motion threshold between successive captures of biometric data.

13. The method as in claim 1, wherein determining whether the processed biometric data meets one or more minimum quality criteria includes determining whether the biometric data includes noise that increases a probability of false acceptance of the biometric data by the host device.

14. The method as in claim 1, wherein transmitting the processed biometric data to the host device for validation enables authentication of a user at the host device.

15. A data processing system comprising:
   an interconnect of a peripheral device that is an input device to enable communication with a host device;
   a memory device;
   a biometric sensor;
   a processor device including or coupled with a secure circuit, wherein the processor device or the secure circuit are configured to execute instructions read from the memory device to perform a method comprising:
      capturing biometric data using the biometric sensor;
      processing the captured biometric data, wherein the processor device is separate from a processor of the host device;
      determining whether the processed biometric data meets one or more minimum quality criteria; and
      in accordance with a determination that the processed biometric data meets the one or more minimum quality criteria, transmitting the processed biometric data to the host device for validation, wherein the host device is a display device that is communicably coupled to the peripheral device, wherein the peripheral device is external to the host device, wherein the host device receives the processed biometric data and validates the processed biometric data to determine whether to allow or deny an action.

16. The data processing system as in claim 15, further comprising, in accordance with a determination that the processed biometric data does not meet the one or more minimum quality criteria, foregoing transmission of the processed biometric data to the host device for validation.

17. The data processing system as in claim 15, wherein capturing the biometric data using the biometric sensor includes:
   receiving a request from the host device to enable the biometric sensor;
   reading sensor data from multiple sensor elements associated with the biometric sensor; and
   assembling a biometric image based on the sensor data read from the multiple sensor elements.

18. The data processing system as in claim 15, wherein determining whether the processed biometric data meets one or more minimum quality criteria includes determining whether the biometric data meets a minimum completeness threshold, a minimum noise threshold, or a minimum motion threshold between successive captures of biometric data.

19. A non-transitory machine-readable medium having instructions stored thereon, the instructions to cause a peripheral device that is an input device having a processor and a biometric sensor to perform operations comprising:
   receiving, from a host device, a request for user authentication, wherein the host device is separate from and communicatively coupled to the peripheral device;
   capturing biometric data using the biometric sensor;
   processing the captured biometric data using the processor;
   determining whether the processed biometric data meets one or more quality criteria; and
   responsive to the request for user authentication:
      in accordance with a determination that the processed biometric data meets the one or more quality criteria, transmitting the processed biometric data to the host device for validation, wherein the host device is a display device that is communicably coupled to the peripheral device, wherein the peripheral device is external to the host device, wherein the host device receives the processed biometric data and validates the processed biometric data to determine whether to allow or deny an action; and
      in accordance with a determination that the processed biometric data does not meet the one or more quality criteria, foregoing transmission of the processed biometric data to the host device for validation.

* * * * *